Patented Aug. 22, 1950

2,519,423

UNITED STATES PATENT OFFICE 2,519,423

PRODUCTION OF DI(CHLOROPHENYL)-TRICHLOROETHANE

Paul Z. Anthony, Linden, and Gustav A. Stein, Plainfield, N. J., assignors to Merck & Co., Inc., Rahway, N. J., a corporation of New Jersey No Drawing. Application February 22, 1945, Serial No. 579,307

2 Claims. (Cl. 260—649)

This application relates to an improved process for the production of di(chlorophenyl)-trichlorethane.

Di(chlorophenyl)-trichlorethane has been prepared by condensing anhydrous chloral and chlorobenzene in the presence of sulfuric acid. The reaction is allowed to proceed with warming (40°–50° C.) and shaking until the product, which is obtained as a white putty-like mass, no longer separates. The reaction proceeds slowly and the product obtained is unsatisfactory as it requires purification to be marketable.

Pursuant to the present invention, it is now discovered that a product free of the undesirable qualities above mentioned can be obtained by conducting the condensation using oleum instead of sulfuric acid and operating at temperatures of about 5° to 20° C. This newly invented process is further advantageous as it proceeds rapidly, requiring merely about 4 to 6 hours as contrasted to the 24-hour or longer period for the prior art process. A further advantage of the process according to this invention is that a cheaper raw material, chloral hydrate instead of anhydrous chloral, can be used without impairing the quality of the product.

The oleum used in this new process can have a sulfur trioxide content as low as 10% or as high as 65% based on total weight, but it is found that about 20% is optimum as the use of oleum having a sulfur trioxide content above or below this value results in lowered yields and in a less pure product. It is preferred to use a ratio of about 5 or 6 parts by weight of oleum (20% $SO_3$) to 1 part by weight of chloral in the reaction mixture, inasmuch as ratios as low as 3 to 1 result in lower yield and a poorer product. Ratios in excess of 6 to 1, such as 9 to 1, offer no advantage although the product obtained is equally good as to yield and purity. It will be understood that lower ratios of oleum to chloral such as 3 to 1 can be used by employing a more concentrated oleum.

The chloral used in the presently invented process can be of the ordinary crude or technical grade or can be one containing appreciable quantities of water (chloral hydrate). Reaction temperatures below about 20° C. are preferred as at above about 25° C. the product obtained has a lower melting point and is less pure than that obtained according to this invention. The reaction according to this improved process proceeds satisfactorily within a period of 4 to 6 hours which accordingly is considered optimum.

The following example illustrates a method of carrying out the present invention, but it is to be understood that this example is given by way of illustration and not of limitation.

Example

About 360 g. of 20% oleum is gradually added over a period of three hours with stirring to a mixture of about 60 g. of crude chloral and 235 g. chlorobenzene, and during the addition the temperature is maintained at about 15° C. After the oleum is added, the product di(chlorophenyl) trichloroethane forms as a crystalline mass and the mixture becomes mushy. The mixture is stirred for an additional 3 hour period, then about 90 gms. of chlorobenzene is added and, upon a further quantity of stratification, the organic layer is separated. The acid layer is extracted with chlorobenzene and the extract is combined with the separated chlorobenzene layer, which is then washed successively with water, dilute ammonium hydroxide and further with water.

The chlorobenzene solution is then concentrated in vacuo until the solvent is removed and molten $\beta,\beta$-dichlorphenyl trichlorethane is obtained (93% yield). This product can be cast and is suitable for milling, mixing with suitable diluents, or other processing. The product thus obtained has a setting point of about 92° C., as contrasted to the setting point of material according to prior art (66–67° C.).

Other halogenated hydrocarbon solvents such as ethylene dichloride which are inert to sulfuric acid can be substituted in the above example for the chlorbenzene added prior to stratification.

Modifications may be made in carrying out the present invention without departing from the spirit and scope thereof and the invention is to be limited only by the appended claims.

What is claimed is:

1. The process which comprises reacting a compound selected from the group which consists of chloral and chloral hydrate with chlorobenzene, the amount of said chlorobenzene employed being sufficient both for the reaction and for dissolving substantially all of the product, in oleum having a sulfur trioxide content of at least 10% at a temperature below about 20° C. to produce a mixture comprising substantially non-aqueous sulfuric acid and a chlorobenzene solution containing di-(chlorophenyl)-trichloroethane; and separating the chlorobenzene layer from the sulfuric acid.

2. The process which comprises reacting chloral with chlorobenzene, the amount of chlorobenzene employed being sufficient both for the reaction and for dissolving substantially all of the product, in oleum having a sulfur trioxide content of from 10 to 20% at a temperature between 41° and 65° F. to produce a mixture comprising substantially non-aqueous sulfuric acid and a chlorobenzene solution containing di(chlorophenyl)-trichloroethane, separating the chlorobenzene layer from the sulfuric acid and distilling off the chlorobenzene from said layer at a temperature above the melting point of the di(chlorophenyl)-trichloroethane.

PAUL Z. ANTHONY.
GUSTAV A. STEIN.

REFERENCES CITED

The following references are of record in the file of this patent:

UNITED STATES PATENTS

| Number | Name | Date |
|---|---|---|
| 2,243,543 | Ter Horst | May 27, 1941 |
| 2,329,074 | Muller | Sept. 7, 1943 |

FOREIGN PATENTS

| Number | Country | Date |
|---|---|---|
| 547,874 | Great Britain | Sept. 15, 1942 |

OTHER REFERENCES

Zeidler: "Ber. der Deut. Chem. Gesell.," vol. 7, pages 1180–1 (1874).

Brand: "Ber. der Deut. Chem. Gesell.," vol. 72B, pages 1029–35 (1939).

Iris et al.: "Rev. Inst. Salub. Enferm. Trop.," vol. 5, page 73 (1944).

Callahan: "Chem. and Met. Eng.," vol. 51, pages 113–114 (1944).